(12) United States Patent
Chiu

(10) Patent No.: US 9,649,703 B2
(45) Date of Patent: May 16, 2017

(54) CIRCULAR SAW WITH A MOVING MECHANISM

(71) Applicant: Rexon Industrial Corp., Ltd., Taichung (TW)

(72) Inventor: Cheng-Hung Chiu, Taichung (TW)

(73) Assignee: REXON INDUSTRIAL CORP., LTD. (TW)

( * ) Notice: Subject to any disclaimer, the term of this patent is extended or adjusted under 35 U.S.C. 154(b) by 493 days.

(21) Appl. No.: 13/826,917

(22) Filed: Mar. 14, 2013

(65) Prior Publication Data

US 2013/0239766 A1  Sep. 19, 2013

Related U.S. Application Data

(60) Provisional application No. 61/611,144, filed on Mar. 15, 2012.

(51) Int. Cl.
*B23D 45/14* (2006.01)
*B23D 45/04* (2006.01)

(52) U.S. Cl.
CPC .......... *B23D 45/046* (2013.01); *B23D 45/048* (2013.01); *Y10T 83/7693* (2015.04)

(58) Field of Classification Search
CPC .. B23D 45/046; B23D 45/048; Y10T 83/7693
USPC ................ 83/490, 471.3, 477, 581
See application file for complete search history.

(56) References Cited

U.S. PATENT DOCUMENTS 4,452,117 A * 6/1984 Brickner et al. ................ 83/468
4,537,105 A    8/1985 Bergler
4,587,875 A    5/1986 Deley
5,054,352 A    10/1991 Fushiya et al.
5,241,888 A *  9/1993 Chen ............................ 83/471.3
5,421,228 A    6/1995 Fukinuki
(Continued)

FOREIGN PATENT DOCUMENTS

TW    I327513 B    7/2010

OTHER PUBLICATIONS

Taiwanese Office Action dated Oct. 14, 2014, for TW 101108881, and English translation thereof.
(Continued)

*Primary Examiner* — Omar Flores Sanchez
(74) *Attorney, Agent, or Firm* — Bacon & Thomas, PLLC

(57) ABSTRACT

A circular saw with a moving mechanism includes a base, a moving unit and a cutting unit. The base has a worktable which has a front side and an opposite rear side, and defines a first plane which extends substantially horizontally from the rear side toward the front side. The moving unit is disposed above the worktable and includes a supporting frame disposed on the worktable. A first sliding shaft and a second sliding shaft are located parallel to each other and disposed at an interval relative to each other on the supporting frame. A moving member is also disposed on the first and second sliding shafts. A second plane is defined as a plane extending through an axis of the first sliding shaft and an axis of the second sliding shaft. Moreover, an included angle is formed between the first plane and the second plane and ranges from greater than zero degrees to smaller than 90 degrees. The cutting unit is pivotally mounted on the moving member and is linearly movable along the worktable in a horizontal direction.

17 Claims, 10 Drawing Sheets

(56) References Cited

U.S. PATENT DOCUMENTS

| | | |
|---|---|---|
| 5,524,516 A | 6/1996 | Sasaki et al. |
| 5,768,967 A | 6/1998 | Sasaki et al. |
| 5,819,624 A * | 10/1998 | Brault et al. ................ 83/471.3 |
| 5,862,732 A | 1/1999 | Itzov |
| 5,870,939 A | 2/1999 | Matsubara |
| 5,937,720 A * | 8/1999 | Itzov ............................... 83/397 |
| 6,016,732 A * | 1/2000 | Brault et al. ................ 83/471.3 |
| 6,170,373 B1 | 1/2001 | Sasaki et al. |
| 6,550,363 B2 | 4/2003 | He |
| 6,561,068 B2 | 5/2003 | Meredith et al. |
| D481,401 S * | 10/2003 | Shoene et al. ............... D15/133 |
| 6,755,108 B2 | 6/2004 | Shull et al. |
| 6,782,783 B2 | 8/2004 | Shull et al. |
| 6,886,440 B2 | 5/2005 | Parks et al. |
| 6,918,330 B2 | 7/2005 | Ng et al. |
| 6,997,091 B1 | 2/2006 | Shibata |
| 7,228,775 B2 | 6/2007 | Wang |
| 7,387,056 B2 | 6/2008 | Higuchi |
| 7,669,510 B2 | 3/2010 | Imamura et al. |
| 7,765,909 B2 | 8/2010 | Meredith et al. |
| 7,905,167 B2 | 3/2011 | Ushiwata et al. |
| 7,997,177 B2 | 8/2011 | Ushiwata et al. |
| 8,025,001 B2 | 9/2011 | Chen et al. |
| 8,127,650 B2 | 3/2012 | Ushiwata et al. |
| 8,161,858 B2 | 4/2012 | Aoyama |
| 8,161,859 B2 | 4/2012 | Ushiwata |
| 2003/0226436 A1 | 12/2003 | Higuchi |
| 2004/0194599 A1 | 10/2004 | Shull et al. |
| 2005/0066788 A1 * | 3/2005 | Chang ............................ 83/490 |
| 2005/0098010 A1 | 5/2005 | Hu |
| 2005/0235791 A1 | 10/2005 | Ushiwata et al. |
| 2006/0027067 A1 * | 2/2006 | Aoyama ........................ 83/581 |
| 2006/0266189 A1 * | 11/2006 | Chen ............................... 83/581 |
| 2007/0074611 A1 | 4/2007 | Hu |
| 2007/0113718 A1 * | 5/2007 | Oberheim .................... 83/471.3 |
| 2007/0186743 A1 | 8/2007 | Hardebeck |
| 2008/0210074 A1 | 9/2008 | Higuchi |
| 2008/0216627 A1 | 9/2008 | Taylor et al. |
| 2009/0007742 A1 | 1/2009 | Nie et al. |
| 2009/0235795 A1 | 9/2009 | Aoyama |
| 2009/0301278 A1 | 12/2009 | Agan et al. |
| 2010/0005938 A1 | 1/2010 | Kani et al. |
| 2010/0236368 A1 | 9/2010 | Firth |
| 2010/0242699 A1 | 9/2010 | Sasaki et al. |
| 2011/0041665 A1 | 2/2011 | Ushiwata et al. |
| 2011/0290092 A1 | 12/2011 | Ushiwata et al. |
| 2011/0314987 A1 | 12/2011 | Aoyama |
| 2011/0314989 A1 | 12/2011 | Xu |
| 2012/0031248 A1 | 2/2012 | Park et al. |

OTHER PUBLICATIONS

Taiwanese Office Action dated Jan. 20, 2014, for TW 101108881, and English translation thereof.

* cited by examiner

CIRCULAR SAW WITH A MOVING MECHANISM

CROSS REFERENCE TO RELATED APPLICATION(S)

This application claims, under 35 U.S.C. §119(e), priority to U.S. Provisional Application No. 61/611,144, filed Mar. 15, 2012, which application is hereby incorporated by reference in its entirety, inclusive of the specification, claims, and drawings.

FIELD OF THE INVENTION

The present invention relates to a circular saw, and more specifically, a circular saw with a moving mechanism.

BACKGROUND

Referring to FIGS. 1 and 2, a conventional circular saw with a movable saw arm is shown as represented by Chinese patent application No. 152478. Such a conventional circular saw has a base 12 which has a cutting groove 11 defined therein, a movable unit 13 pivotally connected to the base 12, and a saw arm 14 pivotally connected to the movable unit 13.

The movable unit 13 has a sliding frame 15 pivotally connected to the base 12, two movable sliding bars 16 both parallelly and intervally disposed on the sliding frame 15 relative to each other, and a sliding base 17 pivotally connected to the saw arm 14 and which is adapted for accommodating the sliding bars 16. The saw arm 14 has a driving motor 18 which is installed on the sliding base 17, and a saw blade 19 which is driven by the driving motor 18 and engageable with the cutting groove 11.

Such a conventional circular saw has many drawbacks. First of all, the entire load of the saw arm 14 and the sliding bars 16 are loaded on the sliding base 17 such that the saw arm 14 may swing vertically, thus influencing the precision of the cutting operation performed. This is because the saw arm 14 is driven by the sliding bars 16 to move further away from the sliding frame 15 due to the sliding bars 16 being both parallel to each other and disposed at an interval relative to each other. Moreover, stability of the saw arm 14 is poor when performing the cutting operation since the saw arm 14 wiggles, which may shorten the usable life of the circular saw.

Second, a structure of the sliding frame 15 has to be enhanced for supporting the saw arm 14 and the sliding bars 16 since the sliding base 17 is suspended above the base 12 with the support of the sliding frame 15. Additionally, the length of the sliding bars 16 have to be lengthened for maintaining the cutting distance at a certain specification, thereby increasing the overall manufacturing cost.

Third, a rear side of the base 12 has to reserve sufficient space for allowing the sliding base 17 to linearly slide when performing the cutting operation since the saw arm 14 is located on a distal end of the sliding base 17. Furthermore, operation of such a conventional circular saw requires adequate space since it is very large in size. The conventional circular saw also takes up a lot of space when storing or moving it.

SUMMARY

An objective of the present invention is to provide a circular saw with a moving mechanism which enhances the stability of the cutting operation performed. The circular saw with a moving mechanism in accordance with the present invention comprises a base, a moving unit, and a cutting unit. The base has a worktable which has a front side and an opposite rear side, and a first plane which substantially extends horizontally from the rear side toward the front side of the worktable.

The moving unit is disposed above the worktable and includes a supporting frame which is disposed on the worktable. Additionally, a first sliding shaft and a second sliding shaft are arranged parallel to each other and disposed at an interval relative to each other on the supporting frame. A moving member is further disposed on the first and second sliding shafts. A second plane is defined as a plane extending through an axis of the first sliding shaft and an axis of the second sliding shaft. An included angle is formed between the first plane and the second plane and ranges from greater than zero degrees to smaller than 90 degrees. Moreover, the cutting unit is pivotally mounted to the moving member and is linearly movable along the worktable in a horizontal direction.

The present invention further provides a circular saw with a moving mechanism with enhanced cutting stability which includes a base, a moving unit and a cutting unit. The base has a worktable which has a front side and an opposite rear side, and a first plane which extends substantially horizontally from the rear side toward the front side of the worktable.

The moving unit is disposed above the worktable and includes a supporting frame which is disposed on the worktable. Additionally, a first sliding shaft and a second sliding shaft are arranged parallel to each other and disposed at an interval relative to each other on the supporting frame. A moving member is further disposed on the first and second sliding shafts. A third plane passes through a rear end of the first sliding shaft and is perpendicular to the first plane such that a sliding distance is formed between a rear end of the second sliding shaft and the third plane. The cutting unit is pivotally mounted to the moving member and is linearly movable along the worktable in a horizontal direction.

The present invention further provides a circular saw with a moving mechanism with enhanced cutting stability which includes a base, a moving unit and a cutting unit. The base has a worktable which has a front side and an opposite rear side, and a first plane which substantially extends horizontally from the rear side toward the front side of the worktable.

The moving unit is disposed above the worktable and includes a supporting frame which is disposed on the worktable. Additionally, a first sliding shaft and a second sliding shaft are located parallel to each other and disposed at an interval relative to each other on the supporting frame. A moving member is disposed on the first and second sliding shafts. A second plane is defined as a plane extending through an axis of the first sliding shaft and an axis of the second sliding shaft. An included angle is formed between the first plane and the second plane and ranges from greater than zero degrees to smaller than 90 degrees. A third plane passes through a rear end of the first sliding shaft and is perpendicular to the first plane such that a sliding distance is formed between a rear end of the second sliding shaft and the third plane. The cutting unit is pivotally mounted to the moving member and is linearly movable along the worktable in a horizontal direction.

In view of the above, a difference is formed between the first sliding shaft and the second sliding shaft with the included angle formed between the second plane and the first plane and the sliding distance. Thereby the load of the cutting unit is distributed evenly in view of the present structural design, thus enhancing the stability of the cutting operation.

BRIEF DESCRIPTION OF THE DRAWINGS

These and other features, aspects, and advantages of the present disclosure will become better understood with regard to the following description, appended claims, and accompanying drawings.

DETAILED DESCRIPTION OF VARIOUS EMBODIMENTS

Figure 1:
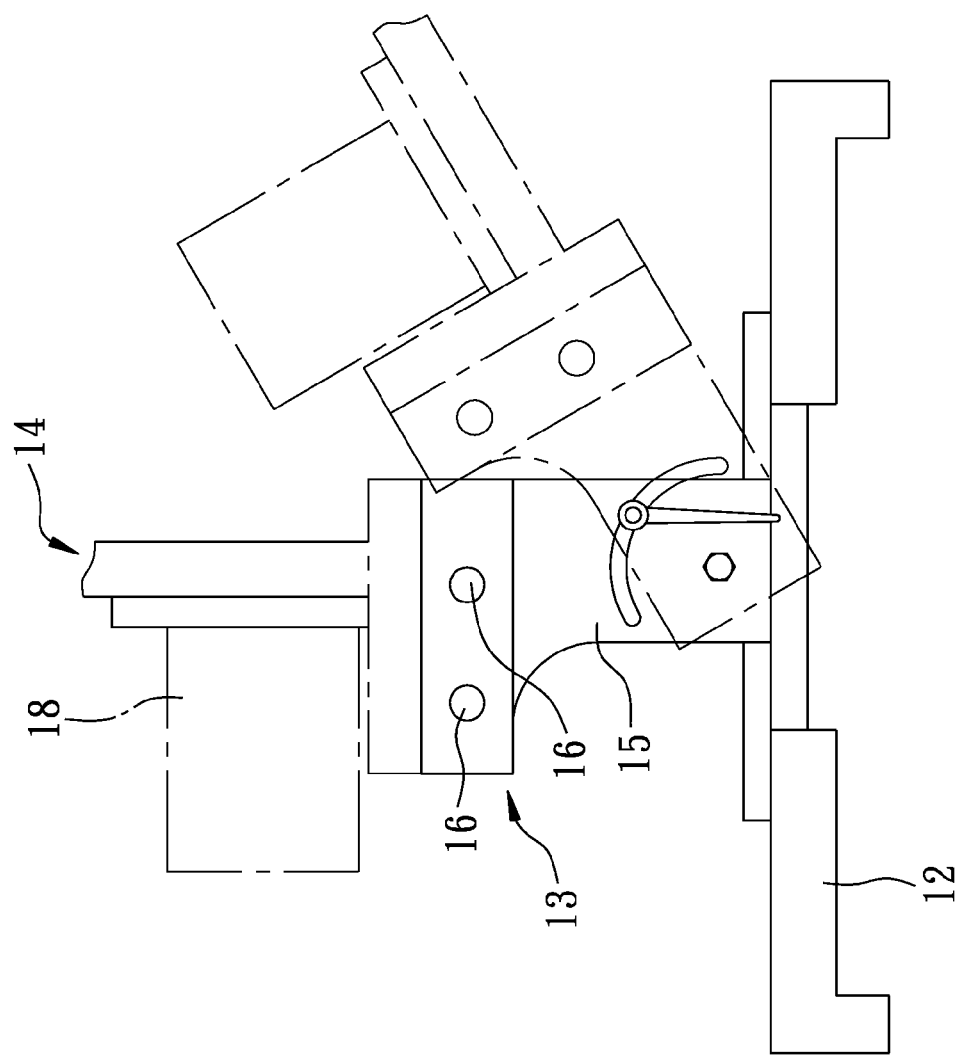
FIG. 1 is a side plan view of a conventional circular saw.
Figure 2:
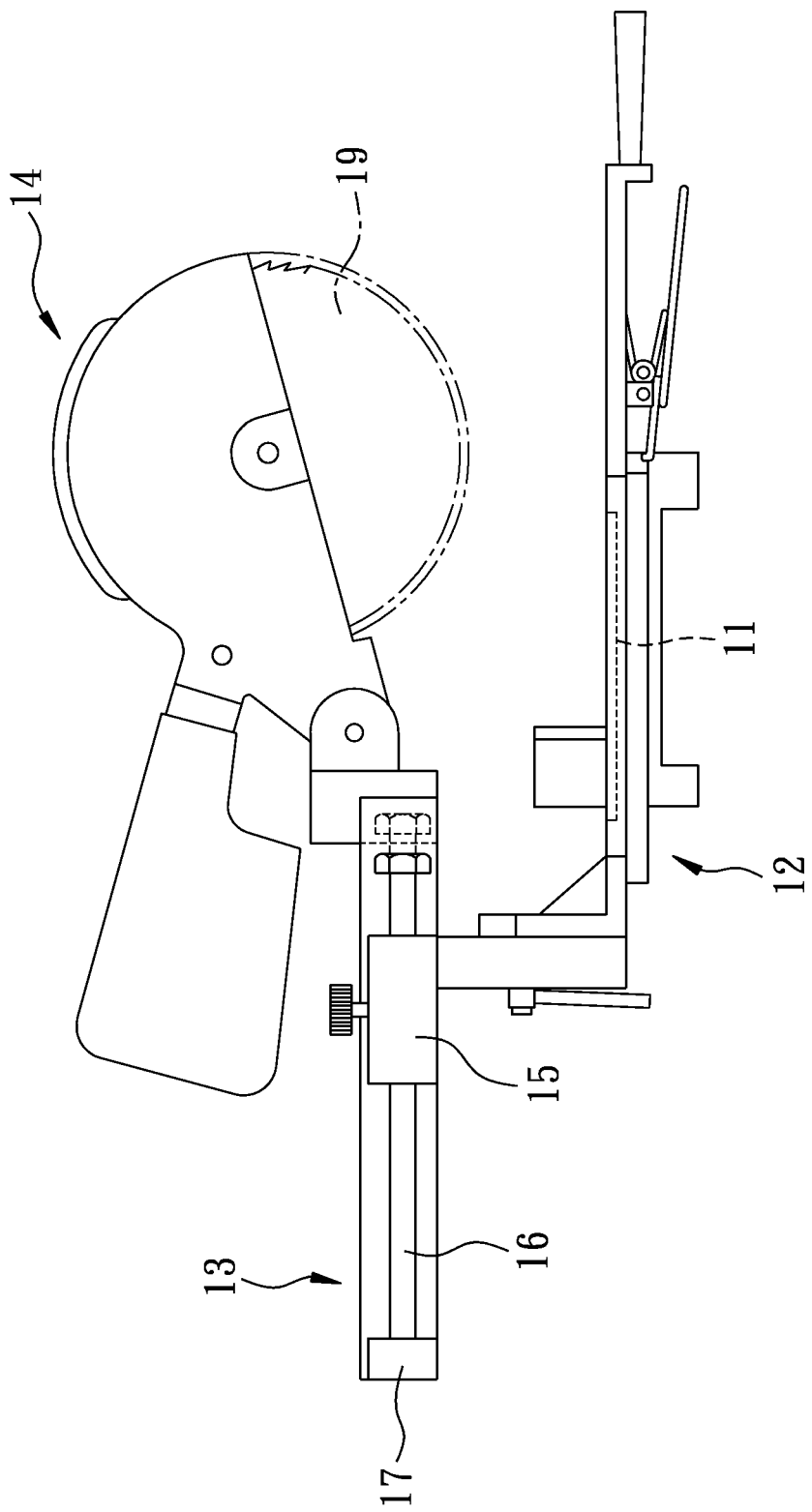
FIG. 2 is a rear plan view of the conventional circular saw of FIG. 1.

The aforementioned advantages and other detailed descriptions, features, and effects of the present invention will be described in further detail below.

While the disclosure is susceptible to various modifications and alternative constructions, certain illustrative embodiments are shown in the drawings and are described below in detail. It should be understood, however, that there is no intention to limit the disclosure to the specific embodiments disclosed, but on the contrary, the intention is to cover all modifications, alternative constructions, combinations, and equivalents falling within the spirit and scope of the disclosure.

It will be understood that, unless a term is expressly defined in this disclosure to possess a described meaning, there is no intent to limit the meaning of such term, either expressly or indirectly, beyond its plain or ordinary meaning.

Figure 3:
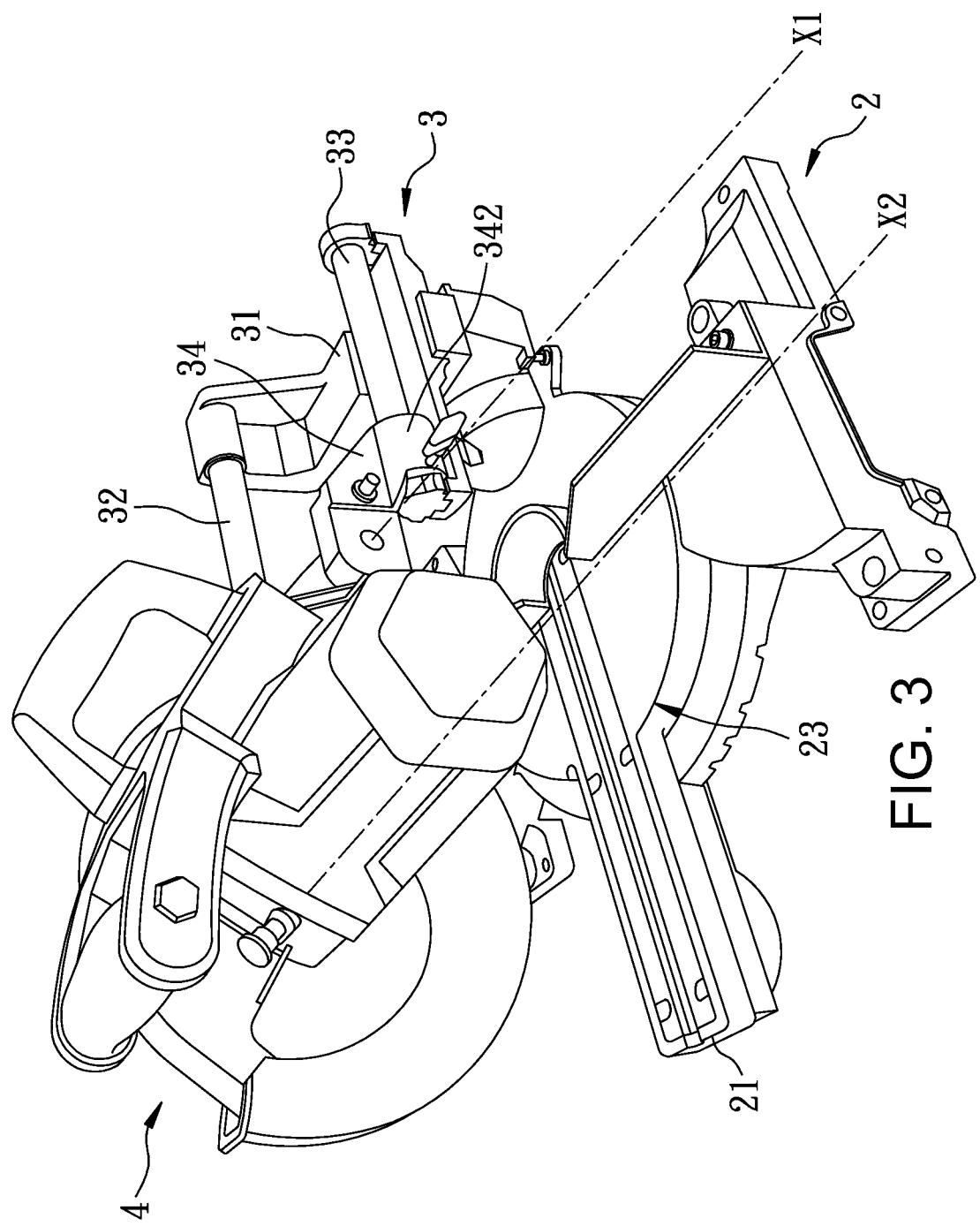
FIG. 3 is a perspective view of a preferred embodiment of a circular saw with a moving mechanism in accordance with the present invention.
Figure 4:
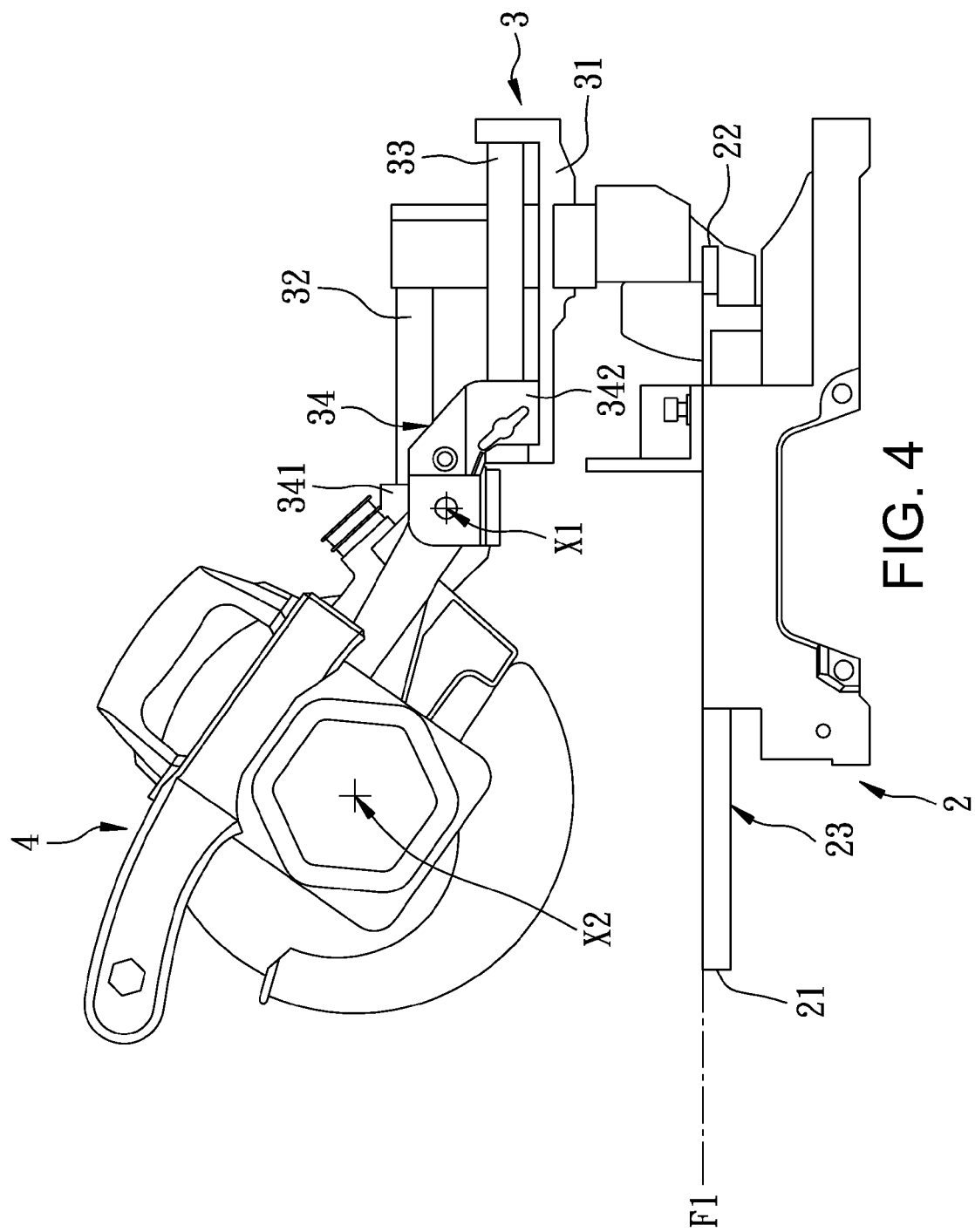
FIG. 4 is a side plan view of the circular saw of FIG. 3.
Figure 8:
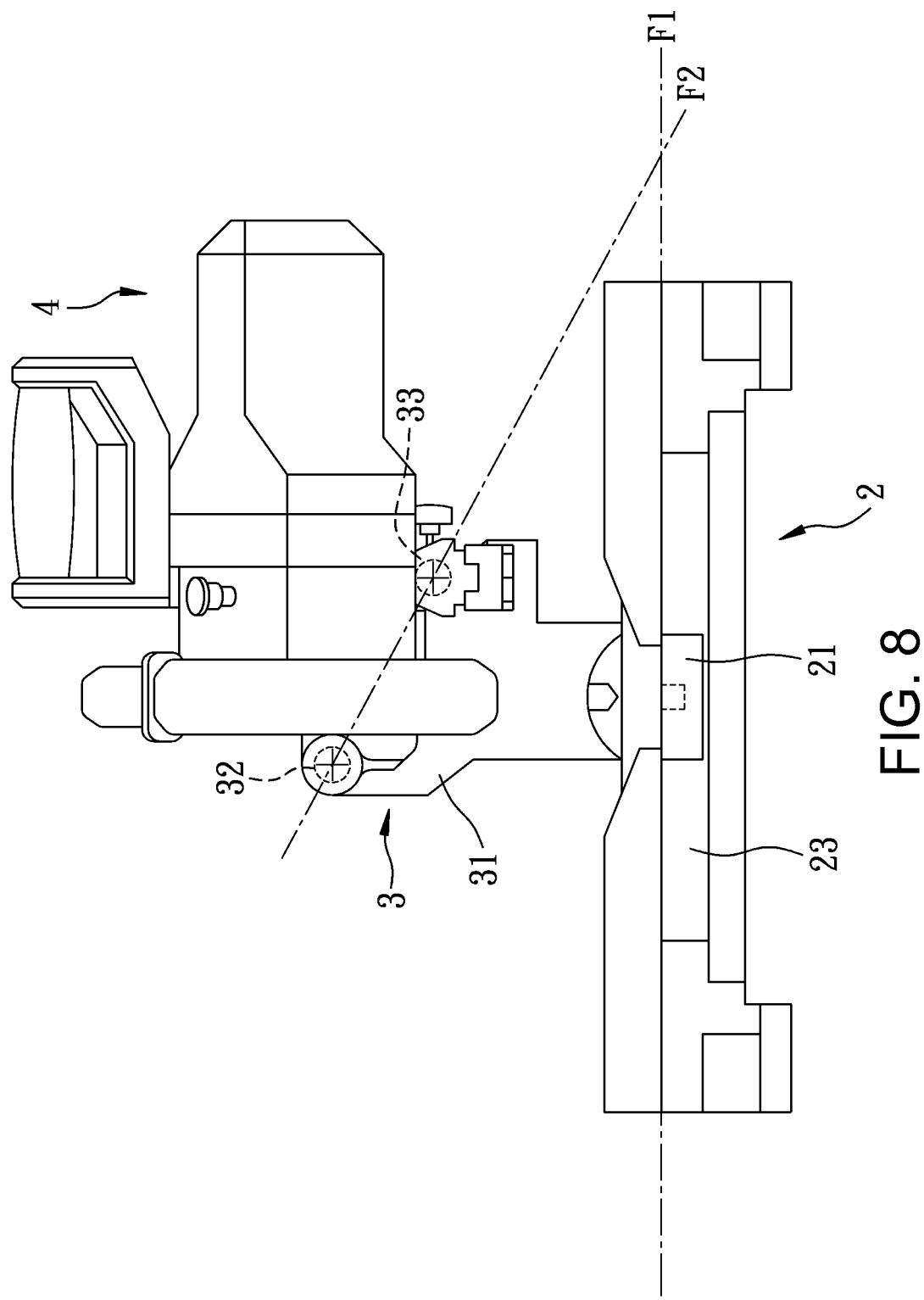
FIG. 8 is a front plan view of the preferred embodiment.

Referring to FIGS. 3-4 and 8, a preferred embodiment of a circular saw with a moving mechanism is shown in accordance with the present invention, and comprises a base 2, a moving unit 3, and a cutting unit 4. The base 2 has a worktable 23 which has a front side 21 and an opposite rear side 22, and a first plane F1 which substantially extends in a horizontal direction from the rear side toward front side.

The moving unit 3 is located above the worktable 23, and includes a supporting frame 31 which is disposed on the worktable 23. Additionally, a first sliding shaft 32 and a second sliding shaft 33 are located parallel to each other and disposed at an interval relative to each other on the supporting frame 31. Further, a moving member 34 is preferably engaged with the first sliding shaft 32 and the second sliding shaft 33.

Figure 10:
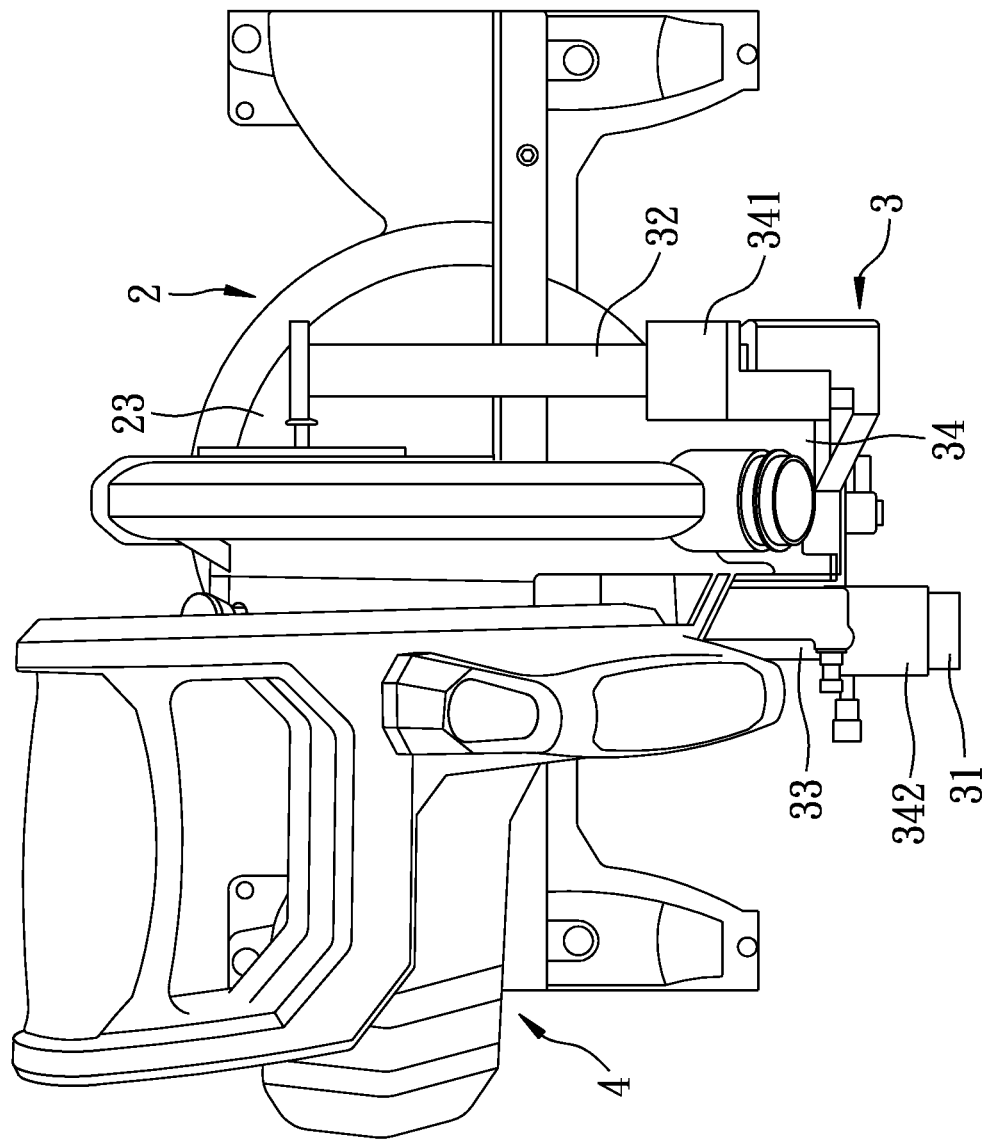
FIG. 10 is a top plan view of the preferred embodiment.

In the present embodiment, a distal end of the first sliding shaft 32 which is located away from the cutting unit 4 is mounted to the supporting frame 31, as shown in FIG. 10, and two opposed ends of the second sliding shaft 33 are respectively mounted to the supporting frame 31. The first sliding shaft 32 can likewise be mounted to the supporting frame 31, such that the moving member 34 is linearly slidable along the first sliding shaft 32 and the second sliding shaft 33.

Figure 9:
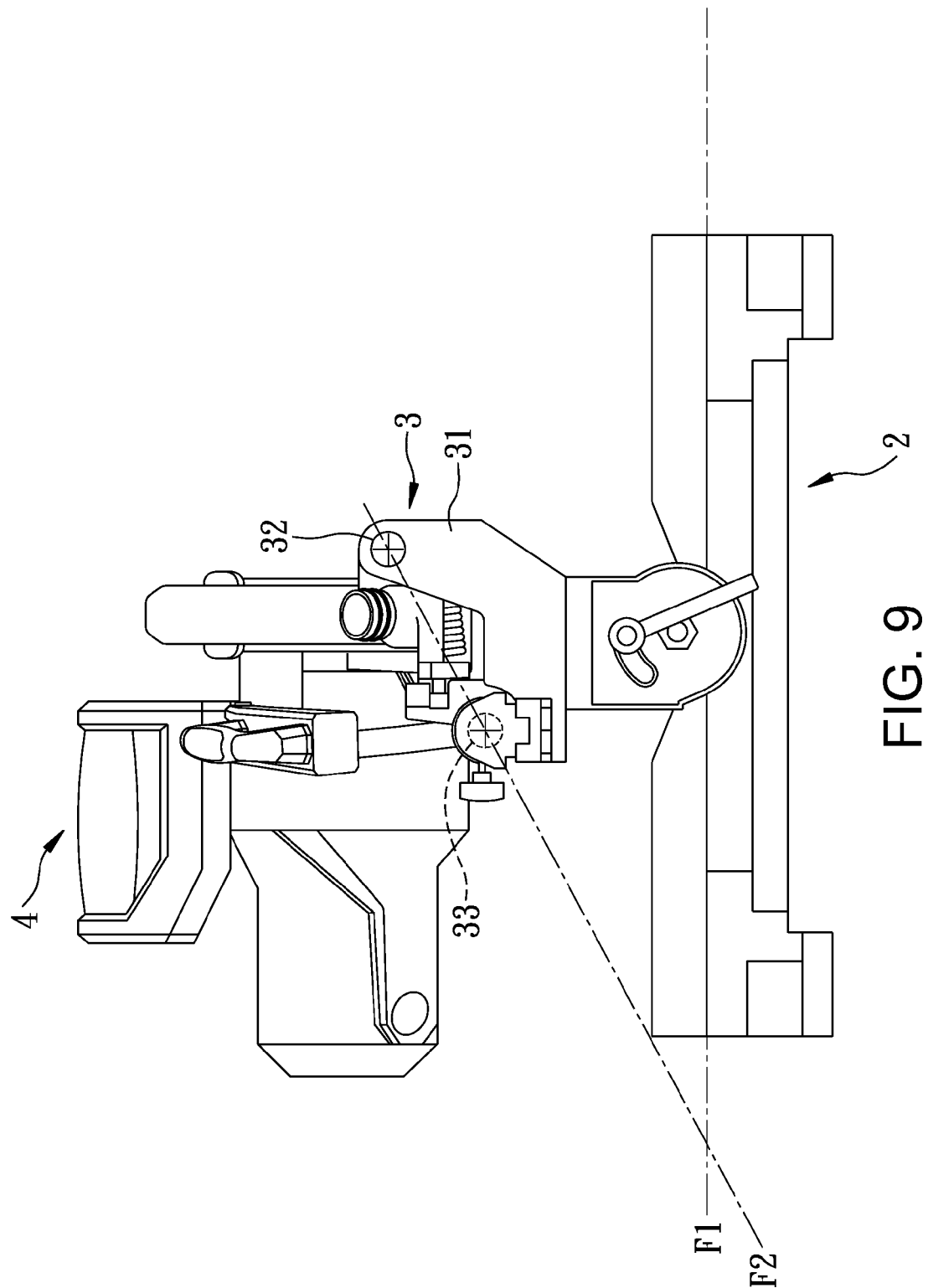
FIG. 9 is a rear plan view of the preferred embodiment.

Turning briefly to FIG. 9, a second plane F2 is defined as a plane which extends through an axis of the first sliding shaft 32 and an axis of the second sliding shaft 33. It should be appreciated that an included angle formed between the first plane F1 and the second plane F2 is greater than zero degrees and smaller than 90 degrees.

Figure 5:
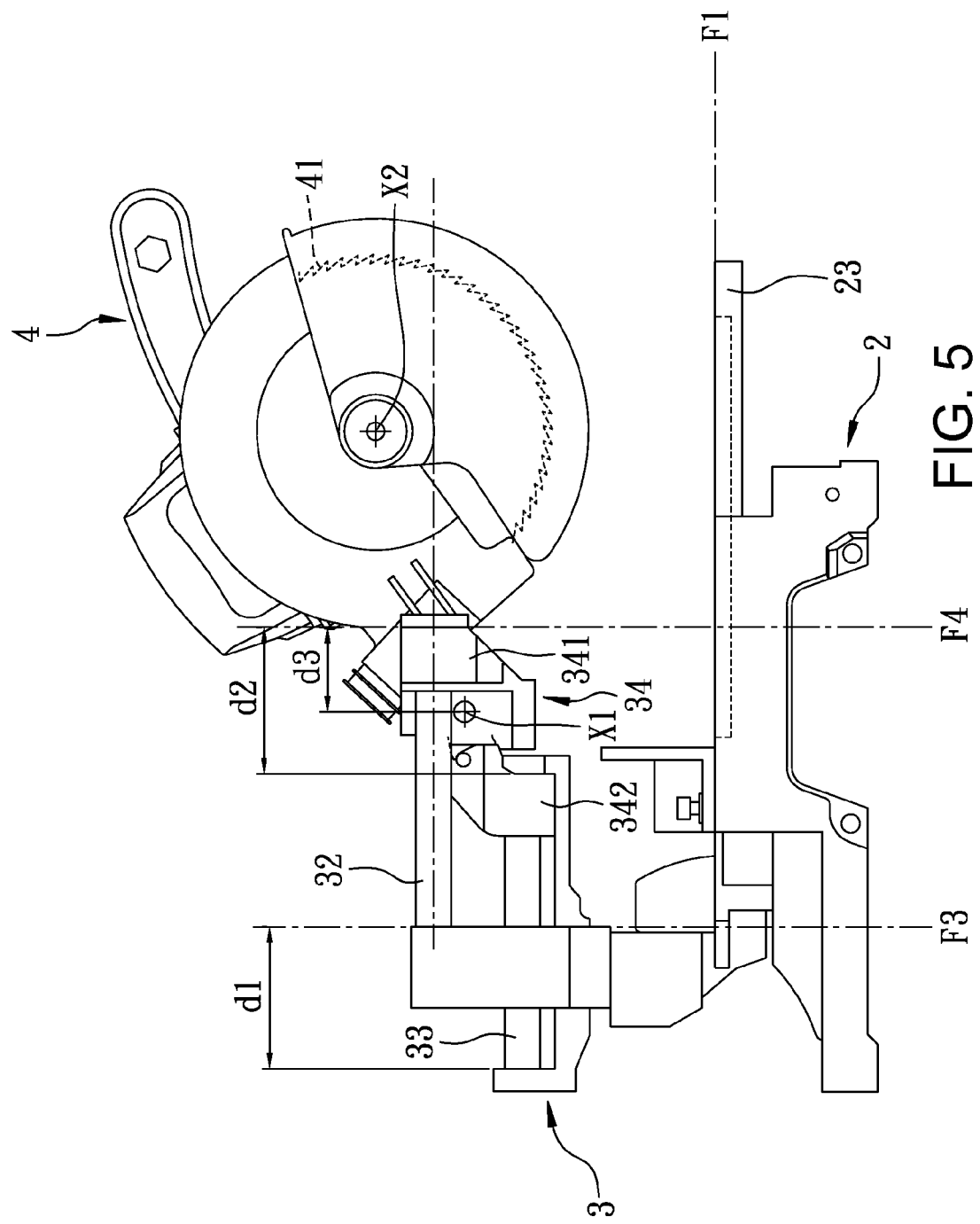
FIG. 5 is side plan view of the circular saw of FIG. 3, wherein a cutting unit is at its highest position.

Referring to FIG. 5, a third plane F3 is defined which passes through a rear end of the first sliding shaft 32 and is perpendicular to the first plane F1. A sliding distance d1 is formed between the third plane F3 and a rear end of the second sliding shaft 33, which corresponds to the third plane F3. The moving member 34 preferably has a first sleeve 341 which is adapted to fit on the first sliding shaft 32, and a second sleeve 342 which is adapted to fit on the second sliding shaft 33, such that the first sleeve 341 is slidably secured to the first sliding shaft 32, and the second sleeve 342 is slidably secured to the second sliding shaft 33. Additionally, a fourth plane F4 is defined which passes through a front side of the first sleeve 341 and is perpendicular to the first plane F1 such that a sleeve distance d2 is formed between the fourth plane F4 and a front end of the second sleeve 342, which corresponds to the fourth plane F4.

Still referring to FIG. 5, the cutting unit 4 is pivotally connected to the moving member 34 and is linearly movable along a horizontal direction relative to the worktable 23. Moreover, the moving member 34 is located between the first sliding shaft 32 and the second sliding shaft 33. It should also be appreciated that the cutting unit 4 has a pivotal axis X1 which is parallel to the fourth plane F4, a cutting axis X2 which is parallel to the pivotal axis X1, and a saw blade 41 which is rotatably mounted about the cutting axis X2. A pivot distance d3, which is smaller than the sleeve distance d2, is formed between the pivotal axis X1 and the fourth plane F4. Additionally, and the pivotal axis X1 is located at a position above the second sliding shaft 33, and under the first sliding shaft 32.

Figure 6:
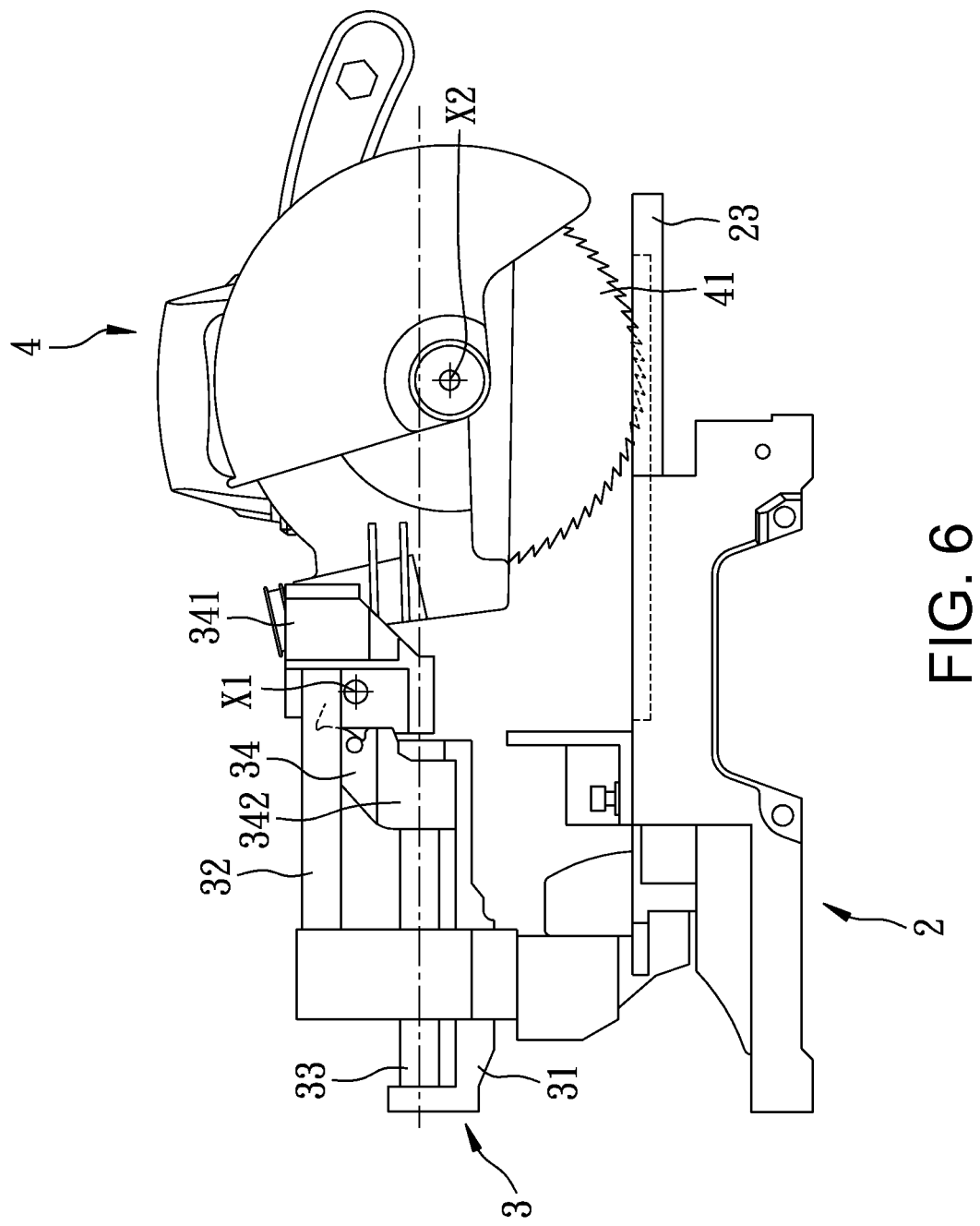
FIG. 6 is a side plan view similar to FIG. 5, wherein the cutting unit is at its lowest position.
Figure 7:
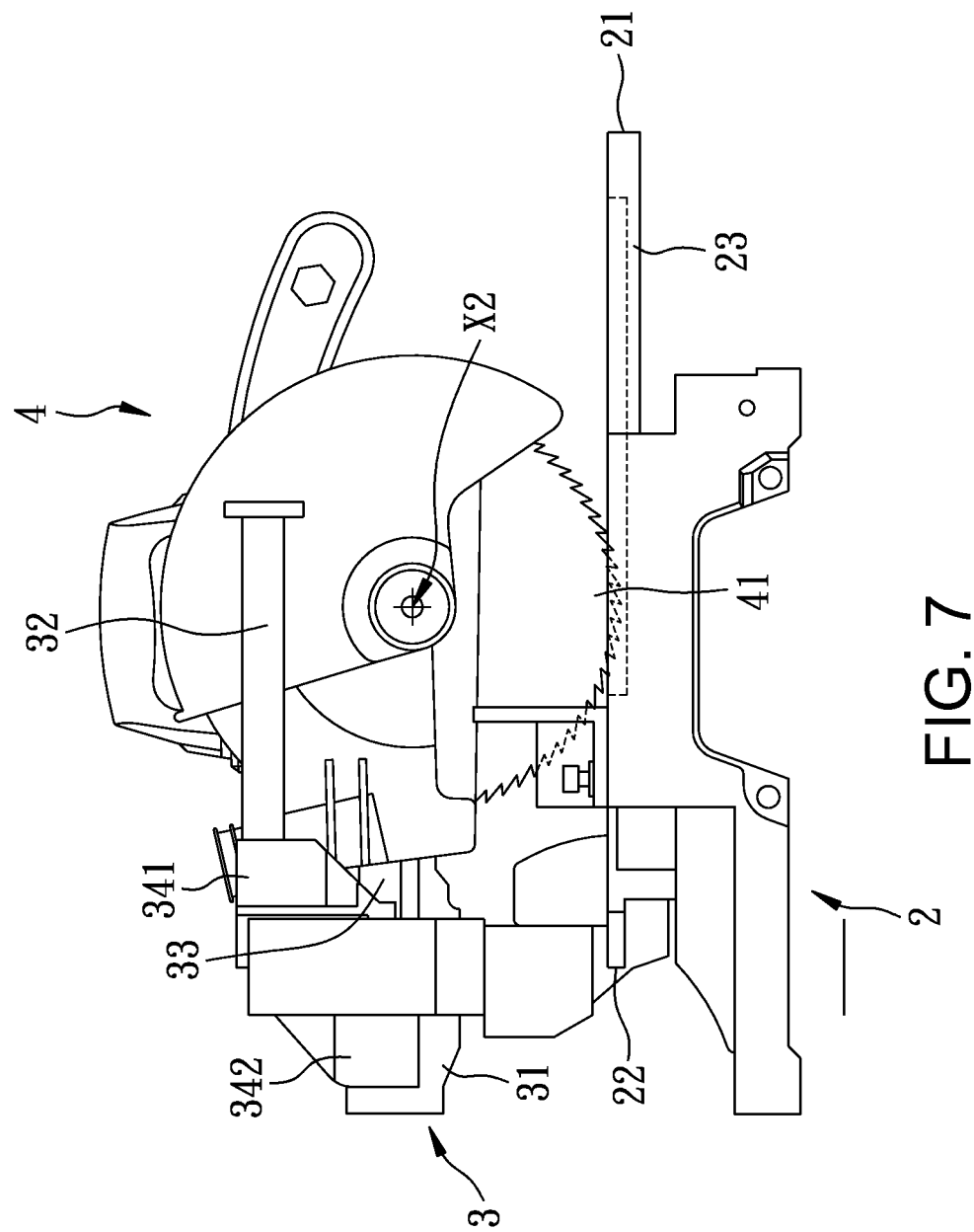
FIG. 7 is a side plan view similar to FIG. 5, wherein the cutting unit is at another lowest position.

Referring to FIGS. 5-7, the cutting unit 4 is movable relative to the worktable 23 between a lowest position and a highest position. When the cutting unit 4 is at the lowest position, the cutting axis X2 is located lower than the axis of the first sliding shaft 32 and the axis of the second sliding shaft 33. When the cutting unit 4 is at the highest position, the cutting axis X2 is located higher than the axis of the first sliding shaft 32 and the axis of the second sliding shaft 33.

When operating the circular saw of the present invention, a work piece (not shown) is first put on the worktable 23 while the cutting unit 4 is located at a highest position as shown in FIG. 5. The cutting unit 4 can be moved to a lowest position for cutting the work piece by pushing down on the cutting unit 4 to slide it along the first sliding shaft 32 and the second sliding shaft 33 to an appropriate position, and then exerting a downward force on the cutting unit 4. When the work piece to be cut has a greater width, the cutting unit 4 can be moved by sliding it along the first sliding shaft 32 and the second sliding shaft 33 when the cutting unit 4 is maintained at the lowest position, thereby allowing for the cutting operation to be performed.

With the above mentioned structure, it can be concluded that the present invention has the following advantages and effects:

First, the included angle between the first plane F1 and the second plane F2 is greater than 0 degrees and smaller than 90 degrees such that a difference in the vertical position between the first sliding shaft 32 and the second sliding shaft 33 is formed. Additionally, the sliding distance d1 causes a front and rear differential between the first sliding shaft 32 and the second sliding shaft 33, so that the moment arm produced due to the loading of the cutting unit 4 is compensated. Accordingly, the stability of the cutting unit 4 is enhanced, the cutting precision is enhanced, and any wobbling of the circular saw is reduced. This helps prolong the usable life of the circular saw.

Second, the pivotal axis X1 is located higher than the second sliding shaft 33 and lower than the first sliding shaft 32, and the cutting unit is pivotally located between the first sliding shaft 32 and the second sliding shaft 33. Since the pivot distance d3 is smaller than that of the sleeve distance d2, the moment arm of the first sleeve 341 and the second sleeve 342 is varied. Consequently, the wobbling of the cutting unit 4 during movement or cutting operation is reduced, and the stability of the cutting unit 4 is thereby enhanced.

Third, the moving member 34 of the present invention has an arrangement with differences in heights and defines a sleeve distance d2. As a result, the moving member 34 has greater area for supporting the cutting unit 4 compared to that of the conventional design, and therefore the overall length of the structure of the moving member can be reduced. Furthermore, because the first sliding shaft 32 and the second sliding shaft 33 are fixedly mounted to the supporting frame 31, the lengths of the first sliding shaft 32 and the second sliding shaft 33 are therefore reduced compared with that of the conventional design, while the sliding distance of the cutting unit 4 is maintained.

Last, because the cutting unit 4 is pivotally connected to the moving member 34 and is located between the first sliding shaft 32 and the second sliding shaft 33, and since the moving unit 3 is located above the worktable 23, and the first sliding shaft 32 and the second sliding shaft 33 are fixed to the supporting frame 31, the overall size of the present invention can advantageously be reduced. It should be appreciated that the cutting unit 4 is slidable relative to the worktable 23 via the first sliding shaft 32 and the second sliding shaft 33 from the front side 21, which is proximate to the worktable 23, to the rear side 22. This can be accomplished without having to retain space between the walls and the worktable 23 for allowing the cutting unit 4 to slide, therefore allowing the present invention to save space.

In view of the above, in addition to the differentials between the first sliding shaft 32 and the second sliding shaft 33, with the co-operation between the sliding distance d1 and the sleeve distance d2, not only is the stability of the cutting unit 4 enhanced such that its usable life is extended, but the circular saw can also be reduced in size. This can result in saving space for storage, as well as reduce overall material cost.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A circular saw with a moving mechanism, comprising:
a base including a worktable having a front side and an opposite rear side, and a first plane extending substantially horizontally from the rear side toward the front side;
a moving unit located above the worktable, the moving unit including a supporting frame disposed on the worktable, a first sliding shaft and a second sliding shaft located parallel to each other and disposed at an interval relative to each other on the supporting frame, a moving member slidably disposed on the first and second sliding shafts, and defining a second plane extending through an axis of the first sliding shaft and an axis of the second sliding shaft such that an included angle between the second plane and the first plane is greater than 0 degrees and smaller than 90 degrees;
a cutting unit pivotally connected to the moving member, wherein the cutting unit is linearly movable along the worktable in a horizontal direction; and
wherein the first and second sliding shafts of the moving unit are respectively mounted to the supporting frame, and wherein at least one of the first and second sliding shafts is mounted at both ends to the supporting frame and the moving member being linearly movable relative to the first and second sliding shafts.

2. A circular saw with a moving mechanism as claimed in claim 1, wherein the cutting unit includes a pivotal axis positioned higher than the second sliding shaft and lower than the first sliding shaft.

3. A circular saw with a moving mechanism as claimed in claim 1, wherein the cutting unit is pivotally disposed between the first and second sliding shafts.

4. A circular saw with a moving mechanism as claimed in claim 1, wherein the cutting unit includes a pivotal axis, a cutting axis parallel to the pivotal axis, and a saw blade rotatably mounted around the cutting axis, wherein the cutting unit is movable relative to the worktable between a highest position and a lowest position such that the cutting axis is lower than the axes of the first and second sliding shafts when the cutting unit is at the lowest position, and the cutting axis is higher than the axes of the first and second sliding shafts when the cutting unit is at the highest position.

5. A circular saw with a moving mechanism, comprising:
a base including a worktable having a front side and an opposite rear side, and a first plane extending substantially horizontally from the rear side toward the front side;
a moving unit located above the worktable, the moving unit including a supporting frame disposed on the worktable, a first sliding shaft and a second sliding shaft located parallel to each other and disposed at an interval relative to each other on the supporting frame, a moving member slidably disposed on the first and second sliding shafts, and defining a third plane passing through a rear end of the first sliding shaft and being perpendicular relative to the first plane, wherein a sliding distance is formed between a corresponding rear end of the second sliding shaft and the third plane;
a cutting unit pivotally connected to the moving member, wherein the cutting unit is linearly movable along the worktable in a horizontal direction; and
wherein the first and second sliding shafts of the moving unit are respectively mounted to the supporting frame, wherein at least one of the first sliding shaft and the second sliding shaft is mounted at both ends to the supporting frame, and the moving member being linearly movable relative to the first and second sliding shafts.

6. A circular saw with a moving mechanism as claimed in claim 5, wherein the moving member of the moving unit includes a first sleeve slidably secured on the first sliding shaft and a second sleeve slidably secured on the second sliding shaft, and defining a fourth plane perpendicular to the first plane passing through a front end of the first sleeve such that a sleeve distance is formed between a corresponding end of the second sleeve and the fourth plane.

7. A circular saw with a moving mechanism as claimed in claim 6, wherein the cutting unit includes a pivotal axis parallel to the fourth plane, and defining a pivot distance, which is shorter than the sleeve distance, formed between the pivotal axis and the fourth plane.

8. A circular saw with a moving mechanism as claimed in claim 5, the cutting unit including a pivotal axis, a cutting axis parallel to the pivotal axis, and a saw blade rotatably mounted around the cutting axis, wherein the cutting unit is movable relative to the worktable between a highest position and a lowest position such that the cutting axis is lower than the axes of the first and second sliding shafts when the cutting unit is at the lowest position, and the cutting axis is higher than the axes of the first and second sliding shafts when the cutting unit is at the highest position.

9. A circular saw with a moving mechanism comprising
a base including a worktable having a front side and an opposite rear side, and a first plane extending substantially horizontally from the rear side toward the front side;
a moving unit located above the worktable, the moving unit including a supporting frame disposed on the worktable, a first sliding shaft and a second sliding shaft located parallel to each other and disposed at an interval relative to each other on the supporting frame, and a moving member slidably disposed on the first and second sliding shafts, and defining a second plane extending through an axis of the first sliding shaft and an axis of the second sliding shaft such that an included angle between the second plane and the first plane is greater than 0 degrees and smaller than 90 degrees, and a third plane passing through a rear end of the first sliding shaft and being perpendicular to the first plane such that a sliding distance is formed between a corresponding rear end of the second sliding shaft and the third plane;
a cutting unit pivotally connected to the moving member, the cutting unit being linearly movable along the worktable in a horizontal direction; and
wherein the first and second sliding shafts of the moving unit are respectively mounted to the supporting frame, wherein at least one of the first and second sliding shafts is mounted at both ends to the supporting frame and, the moving member being linearly movable relative to the first and second sliding shafts.

10. A circular saw with a moving mechanism as claimed in claim 9, wherein the moving member of the moving unit further includes a first sleeve slidingly secured on the first sliding shaft and a second sleeve slidingly secured on the second sliding shaft, and defines a fourth plane arranged perpendicular to the first plane and passing through a front end of the first sleeve such that a sleeve distance is formed between a corresponding end of the second sleeve and the fourth plane.

11. A circular saw with a moving mechanism as claimed in claim 10, wherein the cutting unit further includes a pivotal axis which is parallel to the fourth plane, and defining a pivot distance which is shorter than the sleeve distance and formed between the pivotal axis and the fourth plane.

12. A circular saw with a moving mechanism as claimed in claim 9, wherein the cutting unit includes a pivotal axis located higher than the second sliding shaft and lower than the first sliding shaft.

13. A circular saw with a moving mechanism as claimed in claim 9, wherein the cutting unit is pivotally disposed between the first and second sliding shafts.

14. A circular saw with a moving mechanism as claimed in claim 9, wherein the cutting unit includes a pivotal axis, a cutting axis parallel to the pivotal axis, and a saw blade rotatably mounted around the cutting axis, wherein the cutting unit is movable relative to the worktable between a highest position and a lowest position such that the cutting axis is lower than the axes of the first and second sliding shafts when the cutting unit is at the lowest position, and the cutting axis is higher than the axes of the first and second sliding shafts when the cutting unit is at the highest position.

15. A circular saw with a moving mechanism as claimed in claim 1, wherein the supporting frame is directly attached to the rear side of the worktable top.

16. A circular saw with a moving mechanism as claimed in claim 5, wherein the supporting frame is directly attached to the rear side of the worktable top.

17. A circular saw with a moving mechanism as claimed in claim 9, wherein the supporting frame is directly attached to the rear side of the worktable top.

* * * * *